Jan. 7, 1947.   H. A. SHABAKER   2,413,735
APPARATUS FOR PREPARATION OF CONTACT MASSES
Filed April 2, 1942   2 Sheets-Sheet 1

INVENTOR
HUBERT A. SHABAKER
BY
Ira L. Nickerson
ATTORNEY

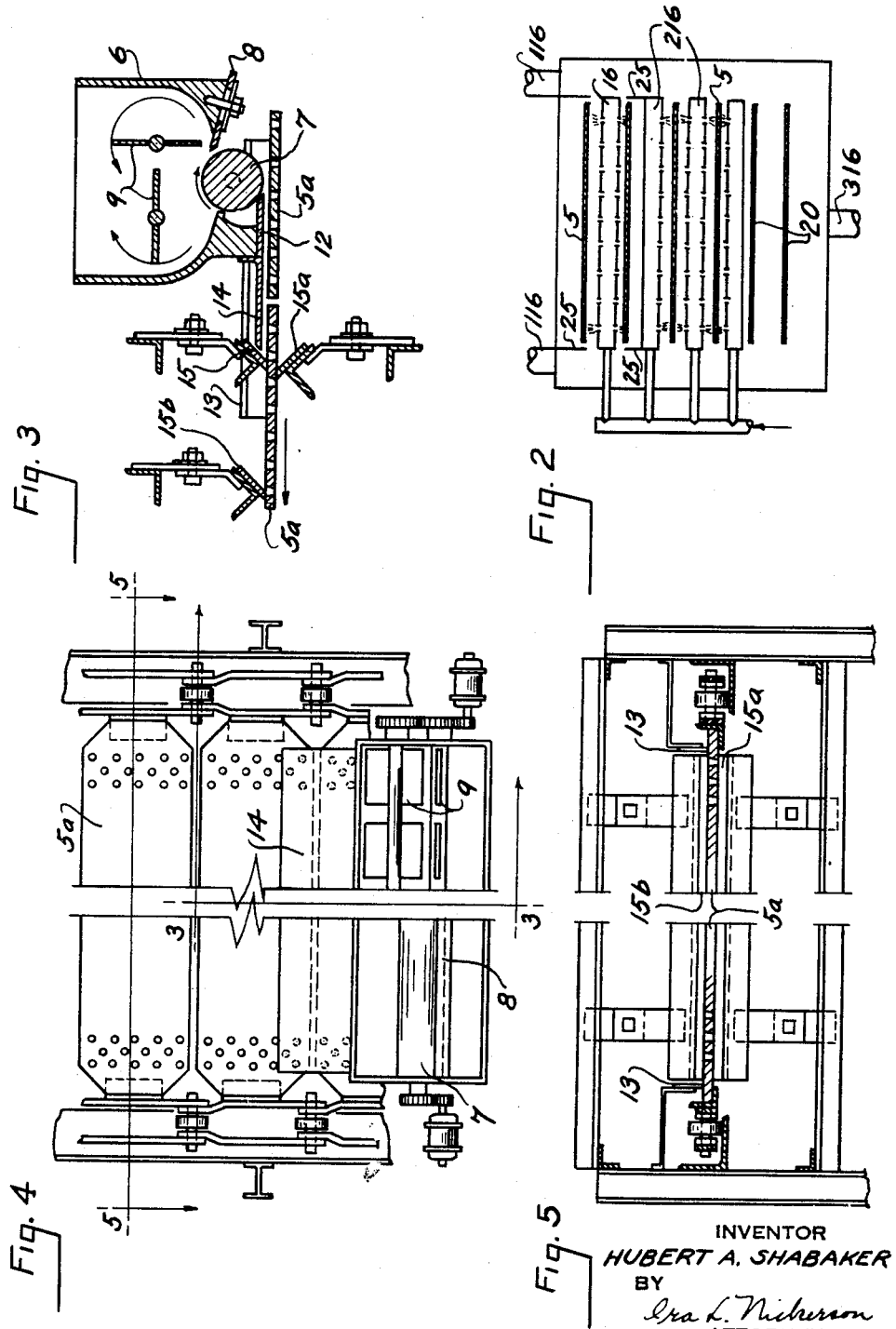

Patented Jan. 7, 1947

2,413,735

UNITED STATES PATENT OFFICE 2,413,735

APPARATUS FOR PREPARATION OF CONTACT MASSES

Hubert A. Shabaker, Media, Pa., assignor to Houdry Process Corporation, Wilmington, Del., a corporation of Delaware Application April 2, 1942, Serial No. 437,321

7 Claims. (Cl. 25—99)

The present invention is in part a continuation of my copending application Serial No. 349,794, filed August 2, 1940. It relates to contact masses and deals in particular with apparatus for manufacture of hard, strong molded units. It is especially concerned with production of molded contact masses from wet molding mixtures which are workable and which develop strength and rigidity upon drying.

One object of the invention is economical and continuous production of molded units of predetermined size and shape. Another object is to obtain molded units of uniform high strength. Another object is to attain the last mentioned object, at least in part, by controlled drying. Another object is apparatus for producing molded units on commercial scale while attaining any or all the above objects. Other objects will be apparent from the detailed description which follows.

The invention involves production of a workable or flowable molding mixture, molding the mixture, and subjecting the molded mixture to drying conditions which develop strength and rigidity therein. The molding mixture comprises finely divided inorganic solid of natural or synthetic origin dispersed in aqueous menstruum, as for example, plastic clay mixes, mixtures of dried and undried precipitated or coagulated gels, or thixotropic masses or pastes of dried synthetic gels. The mix is divided into a plurality of molded units by charging it into molds or receptacles of the desired size and shape and the thus molded material is subjected to drying conditions while retained by the mold or receptacle. According to certain aspects of the invention the molds or receptacles are arranged and adapted for movement successively and preferably continuously through a loading zone, a drying or hardening zone and a discharged zone, in which latter the dried units are removed from the molds. In utilizing the preferred operation involving continuous motion of the molding receptacles through the loading zone, the moldable mixture is formed into a continuous and preferably uniform sheet which is flowed, forced, pressed or otherwise introduced into the molding receptacles. Irrespective of the mechanics of loading the molds, the molded units are preferably dried by subjecting one face to drying conditions while simultaneously subjecting another face of the unit to conditions which substantially retard or even prevent evaporation of water from that face.

A concrete embodiment of the invention is described in the accompanying drawings in which:

Fig. 2 is a sectional elevation taken substantially on line 2—2 of Fig. 1;

Fig. 3 is an enlarged sectional elevation of a preferred arrangement of the loading or feeding portion of the molding machine;

Fig. 4 is a plan view of the feeding and loading device illustrated in Fig. 3; and Fig. 5 is a sectional elevation taken substantially on line 5—5 of Fig. 4 with part of the feeding equipment omitted.

Figure 1:
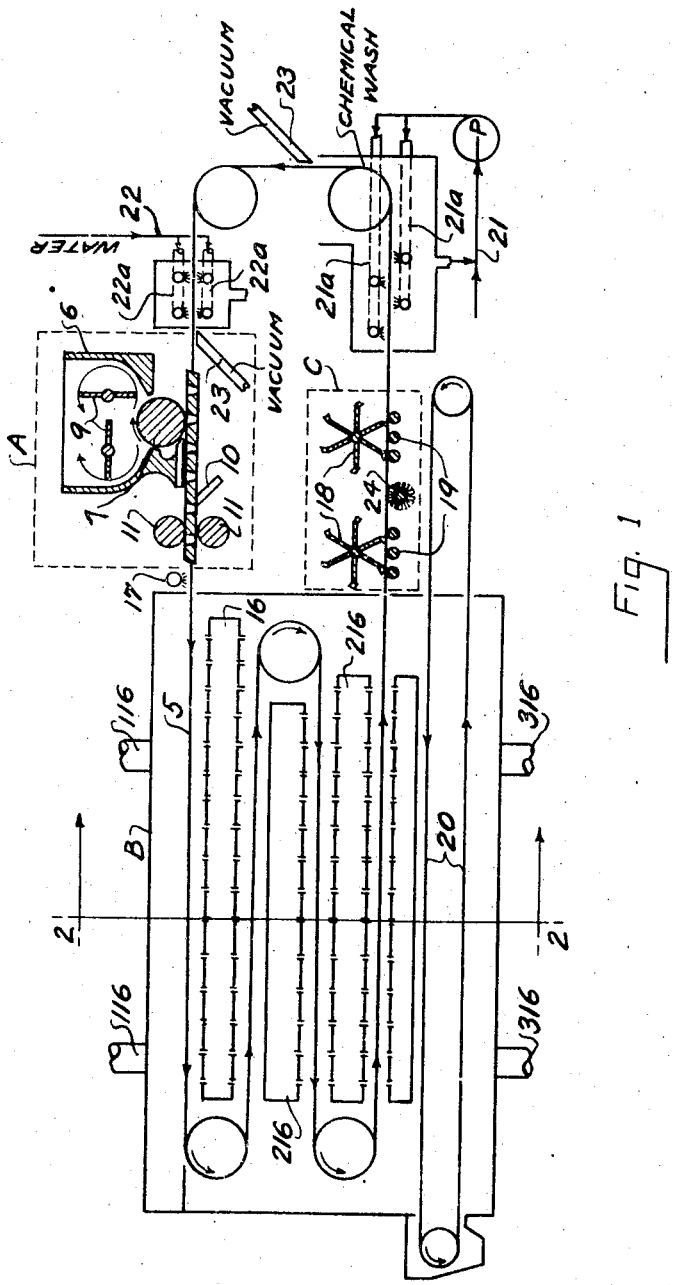
Fig. 1 is a somewhat diagrammatic elevation of one type of unitary molding machine with loading equipment and drying oven shown in section.

Referring to Fig. 1 of the drawings, means providing suitable molding receptacles or apertures are moved successively through a feeding or loading zone A containing suitable equipment for filling the receptacles, a drying zone indicated by furnace or drying chamber B, and an unloading zone C providing suitable equipment for ejecting or otherwise removing the hard, dry, molded units from the receptacles. The molding receptacles may comprise a series of cups of suitable dimensions or closed end apertures provided, for example, in partially drilled plates or in embossed plates or belts, or they may be perforations extending through a plate or belt. As shown, the molding receptacles may be contained in belt-like member 5 which travels successively and preferably continuously through the above described zones A, B, and C. Member 5 may comprise a series of apertured or perforated plates 5a suitably linked together, as for example, after the manner indicated in Figs. 4 and 5.

In loading zone A the prepared moldable mixture, preferably in the form of a substantially continuous paste of desired consistency, for example, a paste containing one or more inorganic oxides produced as gel or gelatinous precipitate by precipitation methods, may be continuously flowed with or without substantial pressure, into the molding apertures or perforations to cast the paste into the desired units. By preference, the moldable mix is formed into a continuous and substantially uniform sheet which is applied to the belt-like member 5 to provide constant and uniform supply of the mix and distribution of it to the molding receptacles. When thin pastes are employed the molding apertures may be filled solely by gravitational flow, in which event the molding apertures may have closed lower ends, being for example, cups produced by drilling partly through or embossing plates 5a. For better control over the molding process and over the uniformity and strength of the molded products, it is preferred to provide positive filling of the apertures by induced flow of the moldable paste into them. When the molded paste is sufficiently thick to be self-supporting within the molding apertures, as is often the case with balling plastic clay mixtures and with comparatively thick mixtures of gelatinous and dried inorganic precipitated gels containing one or more inorganic oxides, and with thick thixotropic pastes of such gels, the molding apertures preferably are perforations extending through the die plates or belt. In fact, use of thick pastes and molding perforations are best adapted for utilization of preferred drying or hardening procedure and for positive ejection from the mold of the dried molded units, as will hereinafter be described in detail.

In the preferred arrangement of the molding machine moldable mix, preferably of the consistency of a thick paste, charged to or produced in hopper 6 disposed above and extending across belt-like member 5 is transferred to plates 5a, as for example, by means of a suitably driven feed roll or cylinder 7 disposed adjacent the discharge port of the hopper to provide a slot between the surface of the roll and the wall of the hopper. The moldable mix adheres to roll 7 and the latter moves the adherent material from hopper 6 as a continuous sheet whose thickness is controlled by the width of the aforementioned slot. The rate at which moldable mix is thus conveyed from the feed hopper may be controlled by the speed of rotation of roll 7, by regulation of the thickness of the sheet, or both. To control regulation of sheet thickness hopper 6 may be provided with suitable means for adjusting the width of the slot, as for example, an adjustable knife or arm 8 as indicated in Figs. 3 and 4. Hopper 6 may be and preferably is provided with suitable mixing or kneading arms 9 which serve the double purpose of working the moldable mixture to maintain it at desired consistency and to force it toward the surface of roll 7. Feed roll 7 may serve the additional purpose of forcing the sheet of moldable material into the molding apertures, to which end it may be in direct contact with plates 5a (Fig. 1) or spaced from them at a suitable distance. (Fig. 3.) When plates 5a provide perforations for receiving the mix, suitable wiping or scraping means, for example, a knife blade of squeegee 10 may be provided to remove excess material forced completely through the perforations. If desired, the material may be subjected to substantial pressure during the molding operation to produce compacting or squeezing of the mix, as for example, by utilization of a pressure roll or pressure surface (not shown) disposed on the under side of belt 5 opposite feed roll 7 or the molded material may be subjected to pressure before going to zone B, as for example, by use of spring loaded rolls 11. Obviously, when the molding apertures are in the form of cups, roll 7 and upper roller 11, or either one of them, will be sufficient to exert substantial pressure.

It is preferred to avoid compression. Thus, as shown in Fig. 3 feed roll 7 may be spaced from belt 5 and the sheet stripped from roll 7 by a suitable knife 12 to be carried by belt 5 into a casting chamber defined by retaining members 13 and 14. In the casting chamber the mixture may be flowed from the sheet into the molding receptacles without substantial compacting or squeezing by use of a flexible blade such as doctor blade or squeegee 15 in sliding or wiping engagement with the surface of moving belt 5. Blade 15 may be a flexible strip of metal but by preference is made up of flexible and easily deformable material, as for example, woven fabric or rubber, to provide close cleaning or wiping engagement of belt 5 despite surface irregularities in the latter. Excess material which has flowed completely through the molding perforations may be removed by a second blade 15a similar to blade 15. In addition to its wiping action blade 15a pushes on the lower ends of the molded units in the perforations to move the units upwardly so that their upper ends extend somewhat beyond the upper surfaces of plates 5a. After the molded material has been hardened, application of pressure to protruding ends thus formed and properly located loosens the molded units within plates 5a to facilitate or effect their discharge.

To further facilitate discharge of the molded mass, the perforations in plates 5a are preferably tapered and the above mentioned protuberances formed adjacent their smaller ends. Since it is best to charge the perforations from the larger ends, a third wiping member 15b is then provided for pushing the molded material back through the perforations to properly locate the desired protuberances. Since, in the preferred operation, little or no pressure is utilized in the loading step beyond that necessary for flowing the mix into the casting molds, side retaining members 13 which serve as guides preventing loss of moldable mix from the ends of the die plates 5a may be of flexible and easily deformable material such as fabric or rubber. Likewise, cover 14 which prevents spillage of moldable mix, may be light in structure.

In the preferred molding apparatus, drying is effected in one or a plurality of passes of carrier or belt 5 through drying chamber B maintained at elevated drying temperature, as for example, within the range of 150 to 500° F. If desired the atmosphere within drying or hardening zone B may be relatively quiescent as by use of suitable radiant elements such as electrical units or steam coils. More rapid drying, however, resulting in greater capacity of the drying oven, is obtained when a suitable drying gas, for example, air, flue gas, superheated steam, or any desired combination of these, heated to the desired drying temperature preferably in the range of 200° to 350° F. is directed against the die plates. Thus, for example, the desired gaseous fluid preheated to desired temperature, may be forced by a fan (not shown) through ducts 16 into chamber B where it impinges on belt 5 to be eventually discharged by ducts 116.

If desired, the drying conditions employed in drying chamber B may be such as to produce slow drying of the molded units, i. e., conditions which produce evaporation from the molded material at rates which are low with respect to diffusion rates of water from interior portions of the units toward exposed faces thereof, whereby uniform and small gradients of moisture content are attained with substantially uniform drying and shrinkage throughout each unit. Molded pieces of satisfactory strength are obtainable in this manner, but the drying procedure is lengthy necessitating greater investment and operating costs than for higher rates of evaporation.

In such drying operations the rate of evaporation is limited to permit gradual migration of water from the interior portions of the molded unit to its exposed surfaces thus providing uniform hardening throughout each molded piece. When, however, the drying conditions are such as to promote more rapid evaporation the hardening process progresses from the exposed surfaces toward interior portions of the mass often producing zones or planes of weakness which adversely affect the strength of the finished product. It has now been discovered that the advantages of fast drying may be realized and a uniform product of strength equal to or greater than that produced by slow or uniform drying may be obtained by subjecting localized surface, usually a single side, of the flowable molded mix to conditions including heat which effect evaporation therefrom progressively through the mass of molded material, while simultaneously maintaining sufficient water in the portions of the mass adjacent other surfaces of the unit to maintain those portions in deformable or flowable condition until dehydrated by loss of water through the unit and from the heated surface. Thus, in following this procedure an evaporation or dehydration front is produced which progresses through the entire unit from the heated surface with the hardening and shrinkage processes progressing with that front. Substantially all movement of material resulting from shrinkage is in the direction of the localized heated surface or side, and substantially no localized hardening or shrinkage occurs to set up opposing forces which produce incipient rupture or points of weakness. When the evaporation front has passed through substantially the entire molded unit, the latter is in coherent and permanently set or non-workable form and usually contain substantial quantities of water whose removal further develops the strength and hardness of the unit, usually with further shrinkage.

Often the molded units attain the desired coherent and permanently set form when only a minor portion of the original water content of the mix is removed. For example, workable thixotropic pastes of dried and substantially pure silica-alumina or silica-zirconia gels may be obtained by vigorously working the finely divided solid in the presence of water in quantities to give about 45–55% water by weight in the finished mix. The molded pastes then usually assume coherent and permanently set form when dried to about 30 to 40% water content. When the dried gel, as submitted to the working step, contains soluble impurities, for example, alkali metal salts or oxides, thixotropic pastes of moldable consistency are sometimes obtained by working water mixes containing as low as 40% or somewhat less water by weight. In such instances, to insure to full extent the advantages of the preferred drying operation it may be desirable to reduce below 30%, as for example, to 25%, the water content of the molded units by this procedure.

As shown in Figs. 1 and 2, the desired progressive evaporation front may be initiated and maintained by one or more perforated ducts 16 located and arranged to impinge heated gas directly against only one side of perforated plates 5a for a portion of their passage through continuous dryer B, thus affecting substantially all water removal from only the ends of the cast units adjacent that side of the belt. Suitable baffles 25 may be employed to minimize or prevent circulation of hot gas over the opposite faces of plates 5a, thereby to prevent excess evaporation from the unheated exposed faces of the molded units.

The desired or necessary quantity of water for maintaining flowability of the molded material in the path of the evaporation front may be applied to the unheated faces of plates 5a in the form of a water film or spray which penetrates the adjacent ends of the molded units, as by use of one or more perforated conduits 17 which may be disposed above the first course of belt 5 and outside dryer B, as shown in Fig. 1, or at one or more points inside the dryer. The actual quantity of water thus applied will vary with the dimensions of the molded unit, its porosity and the quantity of water contained within it as it is loaded into the die plates. To produce uniformly strong molded cylinders of approximately 4 mm. diameter and length from thixotropic or other workable pastes or mixes containing approximately equal quantities of water and previously dried silicious gel, for example, coprecipitated or blended silica and alumina, sufficient water is added when the plates containing the units are covered with a thin film of water before or immediately after they enter the drying chamber. When the additional quantity of water does not produce a moldable mixture which is too thin for loading into and retention by the casting perforations, all the necessary water may be included in the molded mixture as it is prepared or charged into plates 5a. If desired, thin mixes of clay and water or thin pastes containing oxide precipitates may be loaded into closed end apertures or cups. In such event, the drying gas is, of course, impinged on the upper surface of the cups; simultaneously, the lower or closed ends of the cups may be cooled, for example, by a water spray, to assist in retarding or preventing premature hardening of the unheated end of the molded unit. Then a suitable trough or the like may be provided to withdraw excess water from the drying oven.

After the structure of the molded unit has been permanently set by the above described progressive dehydration, further dehydration may be effected in any desired manner. Since formation of localized points or planes of weakness have been avoided to this point, the molded material may be subjected to rapid drying including simultaneous evaporation from opposed surfaces or even from all surfaces without fear of adversely affecting strength, hardness, or thickness. In fact, further dehydration further develops these properties. Thus the molded material in belt 5 may be subjected to further dehydration in the latter passes of that belt through drying chamber B under conditions which utilize all exposed surfaces for removal of water, as for example, by employing ducts 216 simultaneously to impinge air on both sides of perforated plates 5a until the desired degree of dehydration if effected, as for example, in the instance of the above described thixotropic pastes of precipitated materials to a residual water content of 5% or less. Although such further dehydration has been described as taking place while the molded units are retained in the molding receptacles, it is to be understood that part or all of this dehydration may be effected after discharge of the units from the molds.

Discharge of the molds may be obtained by subjecting them to vibration while inverted. When the molded units are formed in perforations to have protuberant ends, they may be discharged by pressure on the protuberances as by passing belt 5 under suitable compression means, for example, a spring loaded or otherwise mounted compression roller. A more efficient removal is obtained, however, when the belt is simultaneously subjected to vibration. One method of obtaining simultaneous pressure and vibration is to subject the proper side of the belt to slapping, beating or rapping action which may be provided by members 18 comprising rotating arms having flexible ends or tips engaging the surface of belt 5. Excessive vibration of the belt may be eliminated by providing suitable supporting members such as rolls 19 located beneath beaters 18. The ejected molded units may be collected in a suitable bin or hopper or, if desired, by a traveling carrier, such as indicated by belt 20, which may, as shown, carry them back through the drying oven to subject them to further dehydration, as by contacting them with hot gases supplied by ducts 316.

Belt 5 and the molding apertures contained therein may be treated to remove adherent particles of dry material and/or to lubricate the walls of the molding cups or perforations before they are again passed through loading zone A. To this end, belt 5 may be washed with a solution of alkali, acid, salt or by other desired solvent supplied by lines 21 containing nozzles 21a, followed by washing with water and/or a lubricant supplied by line 22 and spray 22a. Excess liquid remaining on the molds may be removed by heating or by one or more vacuum jets indicated diagrammatically at 23. Prior to other reconditioning of the molds, excess dust or adherent hardened material may be removed from them by scraping, brushing, or other suitable action, as for example by a rotating wire brush, as indicated at 24.

In one typical application of the invention, molded pellets consisting substantially of precipitated silica and alumina in molar ratio of about 11 to 1 were produced. A hydrous composite of silica and alumina was prepared by coagulating a stream of silica-alumina sol with a solution of ammonium sulphate. The sol was obtained by mixing approximately 122 volumes of sodium silicate solution, obtained by diluting about 105 parts by weight of commercial sodium silicate of about 28.5% silica content with about 45 parts by weight of water, and approximately 170 volumes of sodium aluminate solution, prepared by dissolving about 27 parts by weight of commercial sodium aluminate of about 55% alumina content in about 170 parts by weight of water. The ammonium sulphate solution was prepared by dissolving approximately 27 parts by weight of solid ammonium sulphate in 83 parts by weight of water. Upon mixture of the sol and ammonium sulphate a gel having a pH of the order of 9.6 was produced. This gel was subjected to a mixture of live steam and air for about 45 minutes to accelerate syneresis, then was substantially completely dried at about 200° F. and then subjected to base exchange with ammonium nitrate until practically free of sodium. After water washing a portion of the resulting ammonium zeolite, reduced to 200 mesh size and finer, was subjected to vigorous kneading and mulling action in the presence of an approximately equal weight of water for about 60 minutes under conditions controlled to produce a workable molding mixture which was comparatively stiff and short but capable of low pressure flow into small casting molds. This mixture was formed into a continuous sheet which was flowed at low pressure into perforations of about 4.5 millimeters diameters in continuously moving casting plates about 4 millimeters thick which, after thus being loaded, traveled through a continuous multiple pass drying oven. The thus molded undried mix remained in the perforations without substantial settling or falling during movement of the plates to the oven. Immediately before the plates reached the oven a small quantity of water was added to one end of each of the molded units by means of a spray directed against one face of the plates. In the oven, air heated to about 300° F. was blown against the unwetted sides of the plates while the wetted sides were shielded from the air flow. After about four and one-half minutes drying time, or when the water content of the molded units was about 5% by weight, they were ejected from the plates. Upon test the dried cylindrical units were found to be free of planes of weakness and were capable of supporting concentrated loads of over 1600 grams applied through a knife edge across the axes of the cylinders. Upon heat treatment at about 1200° F. per four hours these cylinders supported loads of about 3500 grams applied as above described. Cylinders molded from the same mixture under identical conditions and subjected to identical drying conditions except omitting the application of water to the casting plates, upon test, were incapable of supporting concentrated loads substantially in excess of 800 grams before the above described heat treatment or substantially in excess of 2000 grams after such heat treatment.

Another portion of the above described washed ammonium zeolite, reduced to 200 mesh and finer, was subjected to mulling and kneading action for about 60 minutes in the presence of a somewhat greater quantity of water than employed for the above described molding mix to produce a molding mixture of such consistency as to be barely self-supporting in the perforations in the absence of jarring. Upon drying the molded cylinders in the continuous multiple pass oven under conditions, including flow of air heated to about 275 to 300° F. over both sides of the plates, which reduced water content of the mix to about 5% in approximately three minutes, the dried cylinders, after ejection from the plates, could not support concentrated loads substantially in excess of 600 grams and had well defined planes of weakness in their center portions. When the drying conditions were controlled within the same temperature range to effect drying and hardening of the molded units in about the same time but progressively from one exposed end of the molded units while preventing premature hardening of the other ends, i. e., by directing the flow of hot air against only one side of the plates containing the cast mixture while shielding the opposite sides of the plates from the air flow, the dried units of about 5% water content successfully supported concentrated loads in excess of 1200 grams and were free of planes of weakness. Heat treatment at about 1200° F., as described, increased the resistance of concentrated load of the former pellets to approximately 1500 grams but failed to eliminate the planes of weakness, whereas such heat treatment of the latter pellets increased their concentrated load resistance to about 3000 grams without affecting their uniformity of strength and hardness.

One typical use of silicious contact masses so produced is to promote or assist in promoting hydrocarbon reactions, including polymerization of ordinarily gaseous olefins to higher boiling and ordinarily liquid products, and cracking of gas oils and/or heavy distillation residues to produce lower molecular weight products, for example, light or distillate fuels, gasoline and ordinarily gaseous hydrocarbons. In such processes the contact mass is used alternately on stream when reactants are contacted therewith and in regeneration when accumulated deposit is burned off. Molded units produced by the process disclosed present porous surfaces and are easily penetrated by reactants and regenerating medium. They are capable of retaining their size and shape for many months of continuous use in recurring cycles of this type. In order to obtain molded contact masses having preferred regeneration characteristics it is preferable so to control the conditions employed in their manufacture as to obtain comparatively high bulk densities and heat capacities. Thus, through regulation of one or more conditions of the manufacturing process, including the degree of pressure utilized in molding compactible molding mixtures and/or the extent of drying or other heat treatment of the molded product contact masses having bulk densities equal to or greater than 500 grams per liter of 4 mm. x 4 mm. cylinders, may easily be obtained. Such is the case even when the undried starting material, for example, gelatinous precipitated silica and alumina is subjected to heat treatment under non-dehydrating conditions, as set forth for example, in the copending application of J. R. Bates and H. A. Shabaker Serial No. 427,918, filed January 23, 1942, to improve or control other characteristics of the molded product. It is to be understood, however, that the invention is not limited to production of high density products nor to utilization of non-dehydrating heat treatment of undried silica-alumina or other gels. On the contrary, molded contact masses of low density are valuable for use in the same or other contact operations and may be produced in, accordance with the invention by utilization of burnable or leachable filling material in the molding mixture, by avoiding compression of the mix in the molds, by drying or curing temperatures which limit shrinkage, or any desired combination of these. Also, when precipitated silica and alumina are employed as starting materials it is not always necessary to employ the above mentioned non-dehydrating heat treatment. Thus, for example, 4 mm. x 4 mm. pellets have been obtained by molding dried silica and alumina gel prepared and molded substantially in accordance with the above specific examples, with the exception that the alumina content of the gel was approximately 9% by weight, and the undried gel was not subjected to such heat treatment. Pellets thus obtained had apparent or bulk densities greater than 600 grams per liter and over resisted concentrated loads of 3000 grams.

The above specific example is illustrative of the production of contact masses comprising two component synthetic gels but indicates only one typical use of the invention and is not to be construed as limiting upon its scope. In its various aspects, the invention finds application in production of a great variety of contact masses which are valuable for use in contact processes in the organic and inorganic fields. The desired contact material may contain only a single component. Thus, for example, it may consist of iron oxide produced by precipitation of ferric hydrate, or of alumina obtained by precipitating hydrous alumina. Likewise the moldable mixture may contain one or more precipitated or coagulated oxides blended or mixed with plastic clay, or it may consist of silicious or non-silicious gels or gelatinous precipitates, for example, of blends or mixtures of silica and zirconia, alumina and zirconia, silica and beryllia; silica, alumina and zirconia; and silica, zirconia and beryllia. Also, the workable mix may comprise one or more of the foregoing substances supporting or diluting hydrous or crystalline materials including compounds of chromium, tungsten, molybdenum, uranium, calcium, nickel, cobalt and copper.

I claim as my invention:

1. In apparatus for molding, a carrier providing a series of perforations, a hopper above said carrier for containing a moldable mixture, a feed roll adapted and arranged to move said material from the hopper to said carrier in the form of a sheet, a wiping blade for flowing said sheet into said perforations to load the same, means for moving said material within the loaded perforations to provide protuberant ends, means providing a drying chamber arranged and adapted to receive said carrier, and means for pressing on said protuberant ends to eject the dried molded units from said perforations.

2. Apparatus for producing molded contact masses comprising, in combination, a series of molding plates having perforations extending therethrough and arranged in an endless belt, feeding means for filling said perforations with moldable material disposed above said belt, means providing a drying chamber enclosing a portion of said belt and disposed between said feeding means and ejecting means adapted and arranged to dislodge the dried molded units from said molds, said feeding means comprising a receptacle for receiving moldable material having an apertured wall, a feed roll arranged and adapted to cooperate with said apertured wall for forming a continuous sheet of moldable material and to transfer said sheet from said receptacle to said plates, wiping means for flowing said sheet into said perforations disposed adjacent said plates and between said receptacle and said drying chamber and a second wiping means disposed on the opposite side of said belt from said first named wiping means for removing excess moldable material from said opposite side of belt.

3. In apparatus for producing molded units the combination which comprises, a plate having top and bottom surfaces and having molding cavities extending therethrough, a hopper provided with means for discharging moldable material from said hopper as a sheet, said plate being mounted for movement below said hopper to receive the sheet of discharged moldable material upon its top surface, filling means spaced from said hopper in the direction of movement of said plate for forcing a portion of the sheet of moldable material on said plate into said cavities and for removing excess material from the plate, the cavities in said plate being tapered inwardly from the top surface of the plate to the bottom surface thereof and the peripheral walls outlining said cavities constituting the sole support for the moldable material therein at the location of said filling means, whereby the moldable material in said cavities is free to extend beyond the bottom surface of the plate at said location.

4. In apparatus for continuously forming molded masses, the combination comprising: a hopper for containing a material of moldable consistency, a movable carrier arranged to pass beneath said hopper, said carrier being provided with perforations extending therethrough having substantially the configuration of inverted truncated cones, transfer means for depositing said material from said receptacle on to said carrier for filling into said perforations, said apparatus from beneath said transfer means and along at least a portion of the carrier in the direction of its movement being free from opposing means below the carrier capable of contacting material in said perforations, so that the peripheral walls bounding said perforations constitute the sole supporting means for the material in said cavities, a drying chamber arranged and adapted to receive said carrier for drying the material in said perforations, and means beyond said drying chamber in the direction of movement of the carrier contacting the carrier at the plane of truncation of the perforations formed thereon, to eject molded material from the carrier.

5. Apparatus for producing molded contact masses comprising a series of plates arranged in an endless belt, said plates having mold cavities therein, a receptacle positioned above said belt for receiving moldable material, means in said receptacle for mixing the material to moldable consistency, means for advancing the belt to move the plates into position to receive the mixed material from the receptacle, means for forming the mixed material into a sheet and for depositing the formed sheet on the plates, means spaced along said belt in the direction of its advance for forcing a portion of the material on the plates into the cavities and removing excess material from the surface of the plates, means for drying the material in the cavities and means for ejecting the dried material from the cavities.

6. In apparatus for producing molded contact masses from workable materials which harden upon drying, a movable carrier providing a series of perforated plates, feeding means above said carrier for forming a sheet of workable molding mixture and depositing said sheet upon said plates, means spaced from said feeding means in the direction of movement of said carrier for wiping material from said sheet into said perforations to fill the same, means for removing excess material from the loaded plates and means providing a drying chamber arranged and adapted to receive said carrier and to dry the material in said perforations.

7. The method of molding units of moldable material which comprises depositing a continuous layer of moldable material upon a temporary supporting surface, contacting said layer from above and forcing a portion of the material constituting said layer beyond the plane of said supporting surface into tapered molding cavities confining the same only peripherally, and without contactually supporting the bottom of the material filling said molding cavities, conveying the material while in said cavities into a drying zone wherein the material is dried and ejecting the dried material from said cavities in a direction consistent with the taper.

HUBERT A. SHABAKER.